United States Patent
Uetsuki

[11] 3,922,068
[45] Nov. 25, 1975

[54] MULTI-LAYER ANTI-REFLECTION COATING WITH HIGH AND LOW INDEX MATERIAL

[75] Inventor: Toshio Uetsuki, Osaka, Japan

[73] Assignee: Minolta Camera Kabushiki Kaisha, Osaka, Japan

[22] Filed: June 17, 1974

[21] Appl. No.: 480,288

[30] Foreign Application Priority Data
June 18, 1973 Japan............. 48-68547

[52] U.S. Cl. .................................. 350/164
[51] Int. Cl.² .......................... G02B 5/28
[58] Field of Search ............ 350/164–166; 117/33.3; 428/426, 428, 538, 539

[56] References Cited
UNITED STATES PATENTS

| | | | |
|---|---|---|---|
| 3,737,210 | 6/1973 | Howe | 350/166 |
| 3,799,653 | 3/1974 | Ikeda | 350/164 |
| 3,829,197 | 8/1974 | Thelen | 350/164 |
| 3,858,965 | 1/1975 | Sumita | 350/164 |

*Primary Examiner*—Ronald J. Stern
*Attorney, Agent, or Firm*—Jackson & Jones Law Corporation

[57] ABSTRACT

A five layer anti-reflection coating for a substrate utilizing respectively a low index, NL, and a high index, NH, material is provided. The high index material has an index of refraction range of 1.95 to 2.35 while the low index material has an index of refraction range of 1.35 to 1.62. The relationship of the optical thicknesses of the coating layers can be expressed as follows:

$$\tfrac{3}{4}\lambda_0 \leq N_2 d_2 + N_3 d_3 + N_4 d_4 + N_5 d_5 \leq \lambda$$

The physical thicknesses of the coating layers can be adjusted to match the design parameters of the coating with any variations in the index of refraction of the substrate.

13 Claims, 5 Drawing Figures

MULTI-LAYER ANTI-REFLECTION COATING WITH HIGH AND LOW INDEX MATERIAL

BACKGROUND OF THE INVENTION

1. Field of the Invention

The present invention is directed to an anti-reflection coating for a substrate to minimize the reflectance of applied energy and more particularly, to five layer anti-reflective optical coatings.

2. Description of the Prior Art

The various attempts to reduce the reflection of energy, such as light, off of a substrate such as glass has been well documented in the prior art. The primary emphasis in the field of optics and photography has been directed to reducing the reflectance of light from glass or plastic substrates across the entire visible spectrum of 400 to 700 nanometers. A number of solutions have been offered to decrease the Fresnel reflection of optically transparent materials especially in optical camera lenses.

The advantages of multi-layer anti-reflection coatings over that of a single or even pair of coating layers is well known. A single or pair of coating layers are not capable of providing satisfactory results over the entire visual region especially for low index glass having a refractive index from 1.45 to 1.9.

The use of multi-layer coatings provide superior results, however production problems increase relating to the evaporation of the coating material and the precise control of the layer thickness. In addition, the layered structures sometimes have the tendency to fractionalize particularly with thin layers and it is often found in production that the commercially available coating material does not maintain or even correspond to its purported theoretical refractive index.

Generally, the coating layers are applied to a suitable substrate with a vacuum coating technique. The greater number of coating layer materials that are utilized the greater number of problems that are encountered such as contamination and controlling the individual evaporation rates. Thus, while the desirability of multi-layer anti-reflection coatings has been recognized as being particularly valuable in reducing residual reflections and maintaining a broad effective bandwidth expecially for color photography, the production of a practical multi-layer anti-reflection coating which accommodates itself to mass production has been difficult to achieve.

The primary design model utilized for multi-layer anti-reflection coatings in the prior art has been the classical solution dependent upon the quarter wavelength structure as represented by the Jupnik's solution, set forth in "Physics of Thin Film," volume 2, P. 272, by G. Hass and R.E. Thun, Academic Press. Anti-reflection coatings utilizing the classical solution have been severely limited by the availability of material having an exact design index of refraction. Further, the actual production of the classical coating designs have been limited by the well known classical proportional relationship between the indices of refraction of the various coating layers.

Recently, an alternative design model for a four layer anti-reflection coating has been proposed in U.S. Pat. No. 3,781,090 granted to Haruki Sumita. This design approach provides flexibility in varying optical and physical thicknesses of the individual layers to compensate for any deviations in the refraction indices.

Various prior art attempts have been made to provide commercial anti-reflection coatings, for example U.S. Pat. No. 3,185,020 and U.S. Pat. No. 3,604,784 suggest three layers of anti-reflective coatings which following the classical design of a $\lambda/4$, $\lambda/2$, $\lambda/4$, wavelength structure. It has been found however that the index of the substrate material must be carefully controlled since it bears a direct relationship to the first and third layers of the coating structure. As known in the prior art, optical glass and plastic that are capable of being utilized in photography generally have a large number of refractive indices distributed between 1.40 and 1.90. The commercially available material for the anti-reflective coating layers by necessity limits the substrate glass or plastic that can be utilized.

Another design approach is disclosed in U.S. Pat. NO. 3,432,225 and U.S. Pat. No. 3,565,509. These anti-reflective coatings have been designed to provide an equivalent thickness layer which consists of two or three thin layers that work as a half wavelength high refractive, NH, index or a quarter wavelength medium refractive, NM, index layer in the anti-reflection coating. By the substitution of two thin layers for the third layer in a four layer anti-reflective coating it is theoretically possible to adjust the two layers to match the index of refraction of the substrate glass. This approach however, has serious limitations because frequently the individual layers must be extremely thin e.g. only 300 angstroms thick. Manufacturing tolerance problems are recurrent with the use of these thin individual layers and the total summation of their effect is simply to provide an equivalent quarter or half wavelength layer in the design. The thinness of the layer itself can cause scattering of the light rays. In addition, the suggested fourth layer is formed of a high index material which generally requires a metal oxide. Metal oxides are often found to be inhomogeneous and unstable in their refractive indices. This is also true with high indexed fluorides. These high index materials can further create problems if they are located next to the substrate because they are very sensitive to the substrate surface condition and also to the existence of water vapor in the air.

Attempts have been made to simplify a multi-layer anti-reflection coating design by utilizing only two materials. For example in U.S. Pat. No. 3,176,574 two separate materials of different refractive indices are co-evaporated to secure an arithmetic mean refractive index or a continuously changing refractive index with respect to the desired thickness. This method however, requires precise control of the evaporation material and technique. U.S. Pat. No. 3,565,509 also utilizes only two materials by providing a symmetrical array of coating layers to obtain an equivalent layer having an equivalent index of refraction and an equivalent thickness.

Finally, U.S. Pat. No. 3,799,653 discloses a multi-layer anti-reflection coating having seven layers of low and high index filming material. This coating utilizes basically a pseudo-equivalent thickness design. There is still a demand in the prior art to provide a multi-layered anti-reflection coating which is susceptible to mass production and can accommodate substrates having a range of indices.

SUMMARY OF THE INVENTION

The present invention provides a five layer anti-reflection coating utilizing respectively a low index, NL, and a high index, NH, material. The high index material has an index of refraction range of 1.95 to 2.35, while the low index material has an index of refraction range of 1.35 to 1.62. Preferably the low index material is magnesium fluoride (MgF2).

The first layer furtherest from the substrate has an optical thickness of approximately ¼ wavelength and a low index of refraction. The second layer is a high index material with an optical thickness of at least ½ wavelength. The third and fifth layers are both low index materials having an optical thickness of less than ¼ wavelength. The fourth layer is a high index material also having an optical thickness of less than ¼ wavelength. The relationship of the optical thicknesses of the layers can be expressed as follows: $¾\lambda_o \lessapprox N_2d_2 + N_3d_3 + N_4d_4 + N_5d_5 \lessapprox \lambda_o$ The first, third and fifth coating layers are selected from a group consisting of $MgF_2$ and $SiO_2$ with $MgF_2$ preferred. The second and fourth coating layers are selected from the group consisting of $CeO_2$, $ZrO_2$, $TiO_2$, $Ta_2O_5$, ZnS and $ThO_2$.

The features of the present invention which are believed to be novel are set forth particularly in the appended claims. The present invention, both as to its organization and manner of operation, together with further objects and advantages thereof, may be understood by reference to the following description, taken in connection with the accompanying drawings.

DESCRIPTION OF THE PREFERRED EMBODIMENT

As may be appreciated by those skilled in the art, the materials suitable for optic coatings have a limited range of compatible refractive indices with the index of the substrate material. In addition, the use of various metal oxides and fluorides, as optic coatings, while providing a relatively high refractive index, are frequently unstable and have inhomogeneous structures. Solutions and compounds of these materials are subject to a number of variables such as the starting stoichiometric structure of the material, the equipment used and the evaporation techniques. In commerical production it is extremely difficult to maintain the precise and consistent control of the various layers of an anti-reflection coating to maintain the final result within the desired design parameters. In addition, increasing the number of materials utilized in a multi-layer anti-reflection coating increases both the control and contamination problems.

In contrast, a low index of refractive material such as $MgF_2$ has a relatively stable index of refraction even with extremely thin film layers. In addition, $MgF_2$ particularly provides a relatively compatible coating with most substrates and serves as an anti-abrasion protection for glass lenses.

The five layer anti-reflection coating of the present invention utilizes the non-classical design theory set forth in U.S. Pat. No. 3,781,090 granted to Haruki Sumita on Dec. 25, 1973. The principles of the Sumita design approach are hereby incorporated within the present specification by reference thereto. Basically, the non-classical design approach permits a flexibility in varying optical thicknesses to compensate for any variations in the indices of refraction from their theoretical value.

Figure 2:
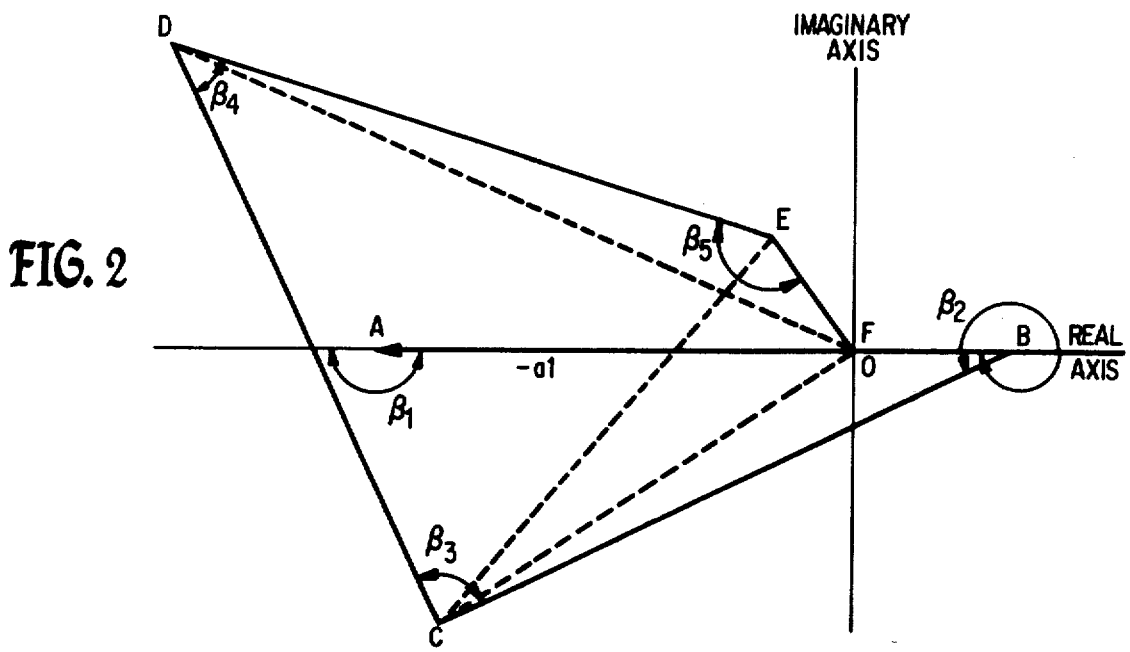
FIG. 2 is a vector diagram of a non-classical design solution.

The following derivations taken in conjunction with FIG. 2 and the teachings of U.S. Pat. No. 3,781,090 will help explain the advantages of the present invention over that of the prior art such as the classical quarter wave design approach.

In the following equations: $\beta$ is the phase factor (angle) due to the rays travelling through the coating layer twice and is expressed by $\beta = 4 \pi/\lambda_o Nd$.

$N$ is the refractive index and $d$ is the physical thickness of the layer. $\lambda_o$ is a preselected design wavelength.

The vector diagram illustrated in FIG. 2 discloses the complex amplitude and phase relationship of the reflected light at each layer boundary for the incident light wavelength. Vector OA is the reflected light ray complex amplitude at the air and first layer interface. Vector OB is the sum of vector OA and the complex amplitude of the first and second layer interface. Vector AB is, of course, the Fresnel Coefficient at the secondary boundary. Vector OC is the sum of the vector OB and the complex amplitude of the rays at the third boundary, wherein OB is again given by the Fresnel coefficient at the boundary. The other vectors OD, OG and OF can be defined in a similar manner.

The respective phase angles are measured from the real axis in a counter clockwise direction. The length of each vector is related to the Fresnel coefficient which is a simple function of the refractive index. The direction $\beta$ of each vector is a function of the optical thickness.

Primarily, the present invention utilizes a non-quarter structure for at least some of the layers of the coating and their corresponding vectors do not end on the real axis but rather in the imaginary plane. The Fresnel coefficients can be adjusted by the phase angle in order to terminate the total reflectance vector at the origin. Due to this non-quarter wavelength design, it is possible to compensate relfectance with respect to refractive index variations by thickness adjustments of the individual coating layers.

The vector diagram disclosed in FIG. 2 provides an optimum solution wherein the total reflectance is the square of the vector OF which is the distance between the origin O and the end point of vector F. The ideal solution is to locate point F as close as possible to the origin O by adjusting the vectors. The actual design computation starts with an approximate solution from the vector diagram and then the designed parameters are optimized with the help of a computer. The computer utilizes the so-called damped least square method with the selection of the appropriate parameters by the designer. The use of the computer helps eliminate repetitious and tedious calculations and produces the best result over the widest possible range in the visual region of 400 to 700 nanometers from which the design wavelength $\lambda_o$ has been selected.

Returning to FIG. 2 and assuming that the vector terminates coincidentally with the origin O we can determine the following trigonometric relationships:

$$<CDE + <DEF + <EFC + <FCD = 2\pi \quad (1)$$

where, $$<CDE = \beta 4, \text{ and } <DEF = \beta 5 \quad (2)$$
$$<EFC = <EFA + <AFC = <EFA + <FBC + <BCF$$
$$= <EFA + (\beta 2 - 2\pi) + <BCF \quad (3)$$
$$<FCD = <BCD - <BCF = \beta 3 - <BCF \quad (4)$$

By inserting equations (2), (3) and (4) into (1) we obtain, $$\beta 2 + \beta 3 + \beta 4 + \beta 5 = 4\pi - <EFA \quad (5)$$

Referring to FIG. 2 we can make the following assumption:

$$0 \leq <EFA \leq \pi$$

Making the assumption that $<EFA$ is larger than zero then equation (5) becomes:

$$\beta 2 + \beta 3 + \beta 4 + \beta 5 \leq 4\pi \quad (7)$$

If $<EFA$ is smaller than $\pi$ then equation (5) becomes:

$$\beta 2 + \beta 3 + \beta 4 + \beta 5 \geq 3\pi \quad (8)$$

Summarizing equations (7) and (8) we obtain, $$3\pi \leq \beta 2 + \beta 3 + \beta 4 + \beta 5 \leq 4\pi \quad (9)$$

Substituting the optical thicknesses of the individual layers for the phase angels we obtain:

$$\tfrac{3}{4}\lambda_o \leq N_2d_2 + N_3d_3 + N_4d_4 + N_5d_5 \leq \lambda_o \quad (10)$$

This equation provides us with the fundamental optical thickness relationship between the four layers. As long as the first and second layers terminate at point C on FIG. 2, then this relationship will hold true for a five layer non-quarter design anti-reflection coating structure.

Depending on the particular index of refraction of the substrate the vector distance EF which is the Fresnel coefficient between the substrate and the fifth layer will vary. However, as can be seen from FIG. 2 by adjustment of the phase angles $\beta 2$, $\beta 3$, $\beta 4$ and $\beta 5$ the end point of vector EF can be relocated close to the origin 0 to maintain the optimum design parameters. In actual practice the individual adjustment of the physical layer thicknesses permits the commercial production of a high quality anti-reflection coating. This thickness adjustment can be accomplished during the actual monitoring of the deposition of material for any variation of either the hypothetical index of refraction for the coating material or for the substrate. For the normal optical glass or plastic having the refractive index in the range of 1.42 to 1.90 the present invention permits the manufacture of a highly desirable five layer anti-reflection coating utilizing only two different materials.

The materials that can be utilized in this invention are a high refractive index material in the range of 1.95 to 2.35 and a low refractive index material in the range of 1.35 to 1.62. The low refractive index material must be relatively chemically stable and the preferred material is magnesium fluoride ($MgF_2$). The following materials are illustrative of the material that can be used in the present invention:

NL — $MgF_2$ (1.385), $SiO_2$ (1.46) $ThF_4$ (1.50), $LaF_2$ (1.56), $LaF_3$ (1.59), $Na_3(AlF_4)$ (1.35), LiF (1.32 – 1.38)

NH — $CeO_2$ (2.00 – 2.30), $ZrO_2$ (1.95 – 2.10), $TiO_2$ (2.00 – 2.30), $Ta_2O_5$ (2.00 – 2.30), ZnS (2.20 – 2.30), $ThO_2$ (2.00 – 2.20).

Figure 1:
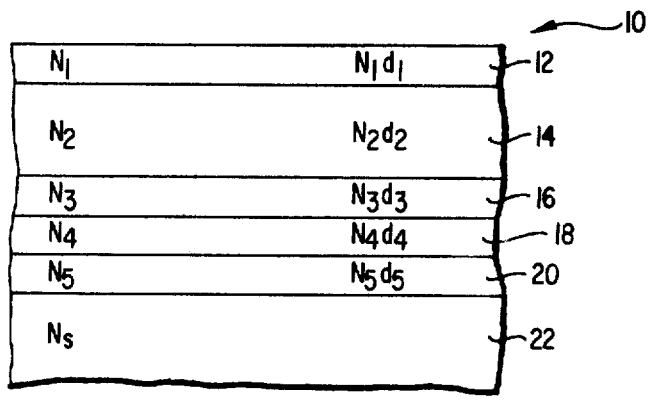
FIG. 1 is a schematic diagram of a five layered anti-reflective coating.

Referring to FIG. 1, a schematic illustration of a coating of the present invention is disclosed. The sub members identify the individual layers starting from the layer furtherest from the substrate, that is the air interface coating and progressively continuing towards the substrate. The first layer 12, the third layer 16 and the fifth layer 20, are formed from a low refractive index material, NL, such as magnesium fluoride. An outer layer or first layer of magnesium fluoride provides protection against both physical and chemical forces. The provision of the magnesium fluoride as the layer adjacent the substrate that is the fifth layer, also protects the glass thus the total composite coating is extremely stable and has both anti-abrasion and anti-humidity characteristics. As mentioned earlier the use of only two separate materials simplifies the production technique and reduces any possibility of contamination.

The second layer, $N_2d_2$ and the fourth layer, $N_4d_4$ have a high refractive index, NH, which can be selected from a number of materials having an index of refraction between 1.95 and 2.35.

The optical thickness relationship of the inventive coating is set forth as follows:

$$N_1d_1 \cong \lambda_o/4$$
$$N_2d_2 \geq \lambda_o/2$$
$$N_3d_3 < \lambda_o/4$$
$$N_4d_4 < \lambda_o/4$$
$$N_5d_5 < \lambda_o/4$$

The present multi-layered anti-reflection coating provides a major advantage over classical quarter wave designs. This is particularly true in matching the coating design parameters to substrates having different indices of refraction.

The following embodiment of the present invention is set forth wherein the index of refraction for the first, third and fifth layers is 1.385 and the index of refraction for the second and fourth layers is 2.15. The following Table sets forth the parameters of the design for various glass substrates.

TABLE 1

| SUBSTRATE GLASS REF. INDEX | | 1.42 | 1.52 | 1.62 | 1.72 | 1.82 |
|---|---|---|---|---|---|---|
| Layer | Ref. Index | Optical Thickness as a unit of ($\lambda_o$) | | | | |
| 1 | 1.385 | 0.256 | 0.257 | 0.257 | 0.257 | 0.256 |
| 2 | 2.15 | 0.533 | 0.547 | 0.552 | 0.562 | 0.569 |
| 3 | 1.385 | 0.117 | 0.117 | 0.113 | 0.104 | 0.097 |
| 4 | 2.15 | 0.052 | 0.070 | 0.084 | 0.106 | 0.118 |
| 5 | 1.385 | 0.209 | 0.128 | 0.110 | 0.092 | 0.081 |

Figure 3:
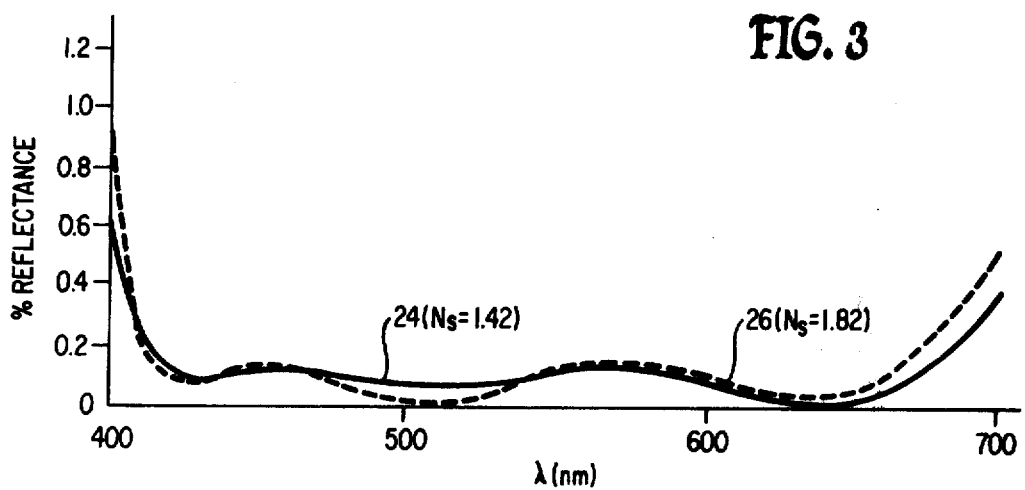
FIG. 3 is a reflectance graph of one example of the present invention in accordance with Table 1.

Referring to FIG. 3, spectral reflectance curves are specifically plotted for Table 1 showing the two extremes of glass substrates. Curve 24 is for a glass substrate having an index of refraction, Ns of 1.42, while curve 26 is for an Ns of 1.82. The intermittent substrate indices can easily be determined from interpolation.

To disclose the advantages of the present invention over that of a classical design. Table 2 is set forth to show the effects of varying the glass substrate index of refraction in a classical four layer quarter wavelength design.

TABLE 2

| Layer | Ref. Index | Optical Thickness As a unit of $\lambda_o$ |
|---|---|---|
| 1 | 1.385 | 0.250 |
| 2 | 2.15 | 0.500 |
| 3 | 1.62 | 0.250 |
| 4 | 1.47 | 0.250 |

Figure 4:
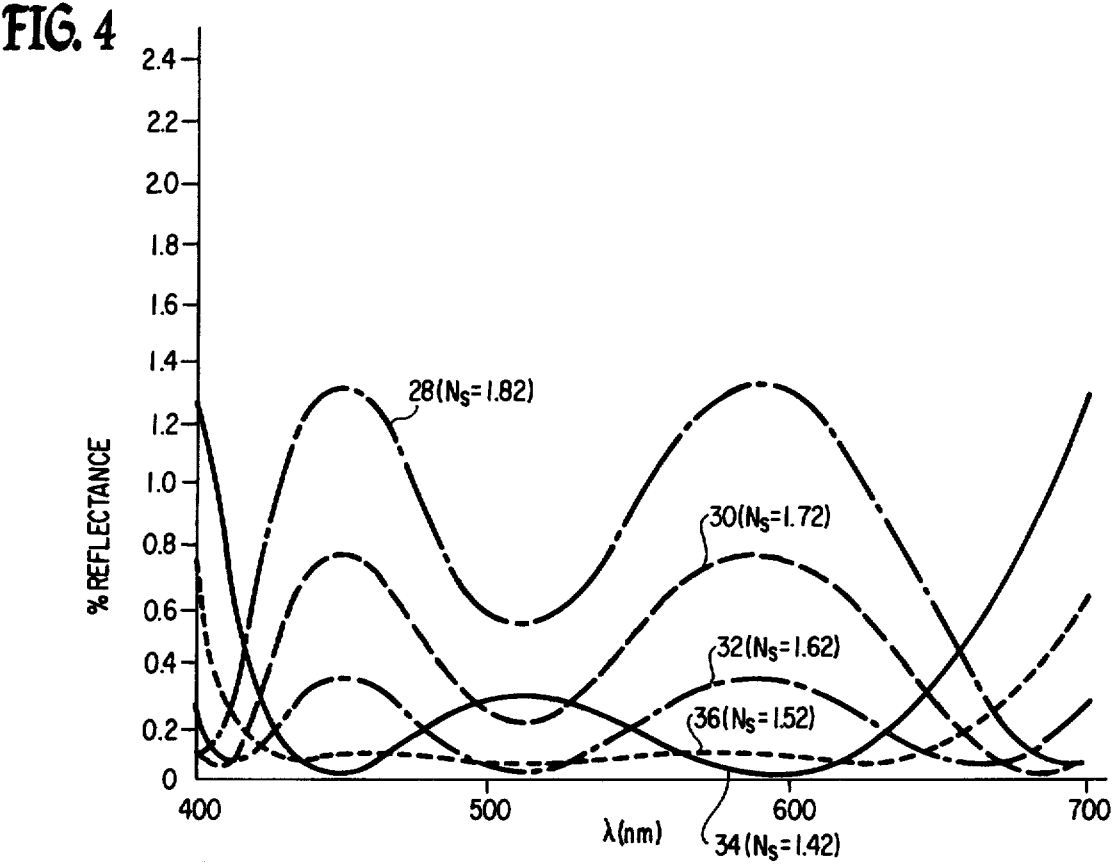
FIG. 4 is a reflectance graph for a series of curves for various substrates of a four layer classical design structure.

Referring to FIG. 4, the reflectance curves are set forth for various glass substrates with a refractive index from 1.42 to 1.82. The best solution is achieved when the substrate index, Ns, equals 1.52. As the substrate index varies from this optimum figure the residual reflection increases as depicted in FIG. 4. The respective curves are set forth as follows;

Curve 28 (Ns = 1.82), Curve 30 (Ns = 1.72),
Curve 32 (Ns = 1.62), Curve 34 (Ns = 1.42), and
Curve 36 (Ns = 1.52).

As can be readily seen from FIG. 4 the classical Jupnik design of an anti-reflection coating is extremely sensitive to variations in the index refraction of the substrate. The ability to compensate for any variations in the substrate is severely limited by the parameters of the classical design.

In the present invention, however, it is possible to utilize just two materials, a separate high and low index material, which can have the physical thickness of the individual layers adjusted to provide a commercially acceptable anti-reflection coating across the full bandwidth range of the visual spectrum. As can be seen from the reflectance graphs, the reflective percent is maintained below 0.3% across the central bandwidth of the visual spectrum with an increase reflectance as known in the art, occurring only at the extreme limits of the spectrum. As can be readily appreciated by those skilled in the art, the present invention provides a relatively simple multi-layered anti-reflective coating that is particularly adapted to meet the requirements of commercial production.

A second example of an embodiment of the present invention is set forth as follows in Table 3, wherein the substrate glass index is 1.62.

TABLE 3

| Layer | Ref. Index | Optical Thickness Unit of $\lambda_o$ |
|---|---|---|
| 1 | 1.385 | 0.256 |
| 2 | 2.0 | 0.560 |
| 3 | 1.385 | 0.096 |
| 4 | 2.0 | 0.099 |
| 5 | 1.385 | 0.077 |

Figure 5:
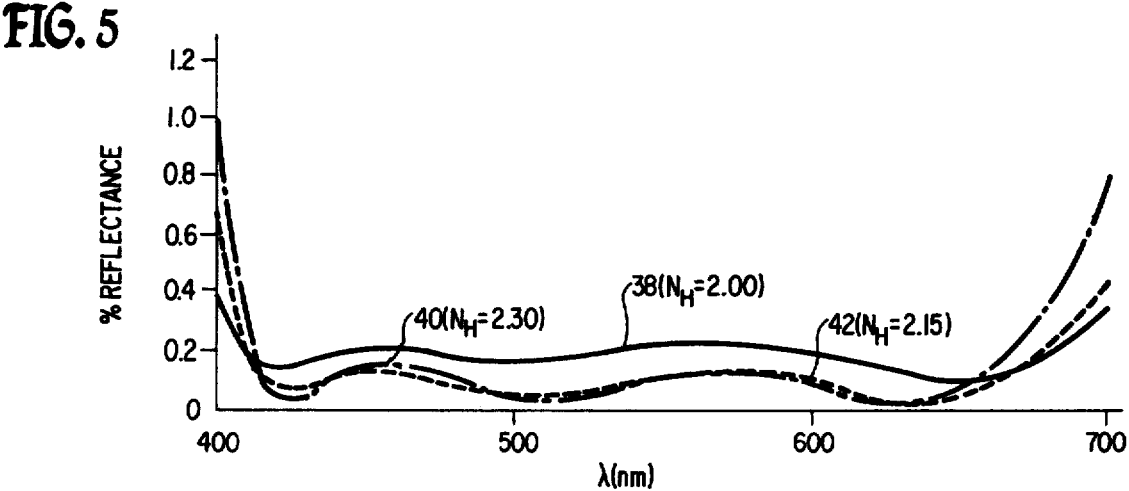
FIG. 5 is a reflectance graph of another example of the present invention in accordance with Table 4.

The illustrative curve for Table 3 is disclosed in FIG. 5 as curve 38 (NH = 2.00).

A third embodiment of the present invention is disclosed in Table 4 with a substrate glass index of $Ns = 1.62$.

TABLE 4

| Layer | Ref. Index | Optical Thickness Unit of $\lambda_o$ |
|---|---|---|
| 1 | 1.385 | 0.255 |
| 2 | 2.30 | 0.546 |
| 3 | 1.385 | 0.121 |
| 4 | 2.30 | 0.072 |
| 5 | 1.385 | 0.147 |

Curve 40 (NH = 2.30) in FIG. 5, corresponds to the anti-reflection coating disclosed in Table 4. Curve 42 (NH = 2.15) corresponds to the anti-reflection coating disclosed in Table 1.

A simple comparison of the reflectance curves in FIGS. 3 and 5 with the classical reflectance curves in FIG. 4 illustrates the advantages of the present invention. As can be appreciated by those skilled in the art, the present invention provides a broad bandwidth anti-reflection coating with the use of only two separate materials. The use of only two materials eliminates evaporation and contamination problems experienced by the prior art. Further, the inventive design approach permits adjustments in the physical thickness of the individual layers to adjust for any variations in the index of refraction of the substrate. This flexibility in adjusting the design coating layers to accommodate the substrate provides obvious advantages in manufacturing glass lenses.

Finally, the use of a stable coating material such as magnesium fluoride ($MgF_2$) as the first and last layer provides a coating structure which is both resistant to the effects of humidity and physical scratches.

While the above discloses the preferred embodiments of the present invention, it should be understood that various modifications are possible within the scope of this invention by workers skilled in the art and accordingly the invention should be measured solely from the following claims:

What is claimed is:

1. A multi-layered anti-reflection coating for use with substrates having an index of refraction in the range of 1.42 to 1.90 to reduce reflectance of light comprising at least five alternating layers of only one high and one low refractive index material, the first layer furtherest from the substrate having an optical thickness $N_1d_1$, of approximately ¼ wavelength and a low index of refraction in the range of 1.35 to 1.62, the second layer having an optical thickness $N_2d_2$, of at least ½ wavelength and a high index of refraction in the range of 1.95 to 2.35, the third layer having an optical thickness, $N_3d_3$, of less than ¼ wavelength and the same index of refraction as the first layer, the fourth layer having an optical thickness, $N_4d_4$, of less than ¼ wavelength and the same index of refraction as the second layer and a fifth layer having an optical thickness, $N_5d_5$, of less than 0.225 wavelength and the same index of refraction as the first layer, wherein $\lambda_o$ is a preselected design wavelength between 400 and 700 nanometers, N refers to the index of refraction and d refers to the physical thickness of the layer, the optical thicknesses being related as follows:

$$\tfrac{3}{4}\lambda_o \leq N_2d_2 + N_3d_3 + N_4d_4 + N_5d_5 \leq \lambda_o$$

2. A multi-layered anti-reflection coating as in claim 1 wherein, the first, third and fifth coating layers are selected from the group consisting of $MgF_2$, $ThF_4$, $LaF_2$, $LaF_3$ $Na_3(AlF_4)$, LiF and $SiO_2$.

3. A multi-layered anti-reflection coating as in claim 1 wherein the second and fourth coating layers are selected from the group consisting of $CeO_2$, $ZrO_2$, $TiO_2$, $Ta_2O_5$, Zns and $ThO_2$.

4. A multi-layered anti-reflection coating as in claim 3 wherein the first, third and fifth coating layers are selected from the group consisting of $MgF_2$, $ThF_4$, $LaF_2$, $LaF_3$, $Na_3(AlF_4)$, LiF and $SiO_2$.

5. A multi-layered anti-reflection coating as in claim 4 wherein the substrate is a glass.

6. A multi-layered anti-reflection coating as in claim 1 wherein the first, third and fifth coating layers are $SiO_2$.

7. A multi-layered anti-reflection coating as in claim 1 wherein the substrate is a glass.

8. A multi-layered anti-reflection coating as in claim 7 wherein the first, third and fifth coating layers are selected from the group consisting of $MgF_2$, $ThF_4$, $LaF_2$, $LaF_3$, $Na_3(AlF_4)$, $LiF$ and $SiO_2$.

9. A multi-layered anti-reflection coating as in claim 1, wherein the first, third and fifth coating layers are $MgF_2$.

10. A multi-layered anti-reflection coating as in claim 9, wherein the second and fourth coating layers are selected from the group consisting of $CeO_2$, $ZrO_2$, $TiO_2$, $Ta_2O_5$, $ZnS$ and $ThO_2$.

11. A multi-layered anti-reflection coating for use with a substrate having an index of refraction in the range of 1.42 to 1.90 for reducing the reflectance of energy below 0.3% across the central bandwidth of the visual spectrum in the range of wavelengths of from 450 to 650 Nanometers comprising at least five sequential layers of an alternative high and low refractive index material, the first layer furtherest from the substrate having an optical thickness $N_1 d_1$ of approximately ¼ wavelength of a preselected design wavelength $\lambda_o$ and a low index of refraction in the range of 1.35 to 1.62, the second layer having an optical thickness $N_2 d_2$ of greater than ½ wavelength and a high index of refraction in the range of 1.95 to 2.35, the third layer having an optical thickness $N_3 d_3$ of less than ¼ wavelength and the same low index of refraction as the first layer, the fourth layer having an optical thickness $N_4 d_4$ of less than ¼ wavelength and the same high index of refraction as the second layer and a fifth layer having an optical thickness $N_5 d_5$ of less than 0.225 wavelength and the same low index of refraction as the first layer wherein $N$ refers to the index of refraction and $d$ refers to the physical thickness of the layer, the low index of refraction material of the first, third and fifth coating layers being selected from the group consisting of $MgF_2$, $ThF_4$, $LaF_2$, $LaF_3$, $Na_3(AlF_4)$, $LiF$ and $SiO_2$, and the high index of refraction material of the second and fourth coating layers being selected from the group consisting of $CeO_2$, $ZrO_2$, $TiO_2$, $Ta_2O_5$, $AnS$, and $ThO_2$, the optical thickness of the second through fifth layers being related as follows:

$$\tfrac{3}{4}\lambda_o \leq N_2 d_2 + N_3 d_3 + N_4 d_4 + N_5 d_5 \leq \lambda_o.$$

12. A five layered anti-reflection coating for use with an optical substrate having an index of refraction in the range of 1.42 to 1.90 to provide a low, relatively constant reflectance of light across the central region of the visual spectrum with only two separate coating materials of a high and low refractive index comprising:

a first layer furtherest from the substrate having an optical thickness, of approximately ¼ design wavelength and a low index of refraction in the range of 1.35 to 1.62;

a second layer having an optical thickness greater than ½ design wavelength and a high index of refraction in the range of 1.95 to 2.35;

a third layer having the same index of refraction as the first layer and an optical thickness of less than ¼ design wavelength;

a fourth layer having the same index of refraction as the second layer and an optical thickness of less than ¼ design wavelength, and;

a fifth layer having the same index of refraction as the first layer and an optical thickness of less than 0.225 the design wavelength, wherein the design wavelength is preselected between 400 and 700 nanometers.

13. An anti-reflection coating as in claim 12 wherein $N$ refers to the index of refraction and $d$ refers to the physical techniques of the layer and the optical thickness of the second through fifth layers are related as follows;

$$\tfrac{3}{4}\lambda_o \leq N_2 d_2 + N_3 d_3 + N_4 d_4 + N_5 d_5 \leq \lambda_o.$$

* * * * *